April 23, 1968 A. G. JOHNSON 3,378,945
FISHING APPARATUS
Filed Oct. 22, 1965
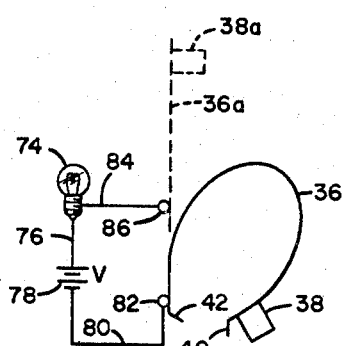
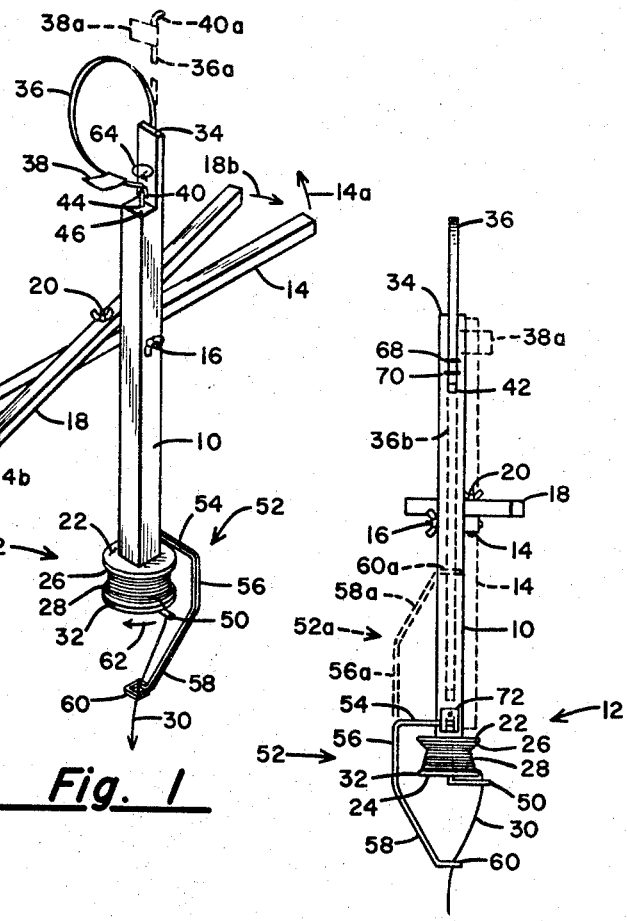
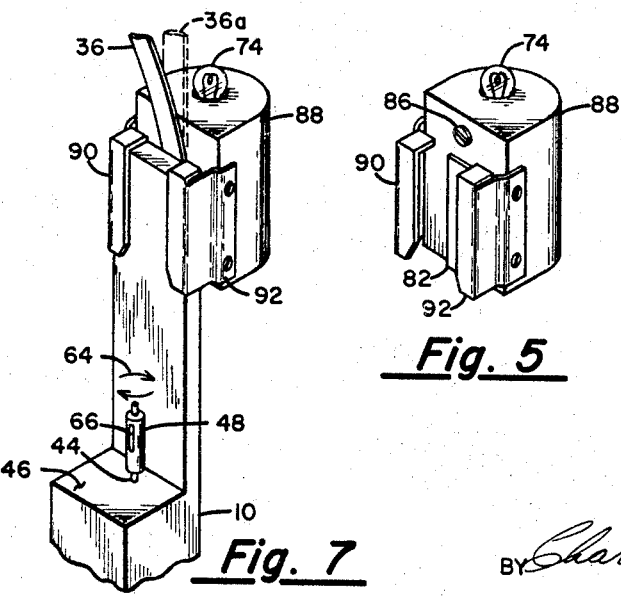
INVENTOR
ARCHIE G. JOHNSON
BY Charles G. Johnson
ATTORNEY

United States Patent Office 3,378,945
Patented Apr. 23, 1968

3,378,945
FISHING APPARATUS
Archie G. Johnson, Amery, Wis. 54001
Filed Oct. 22, 1965, Ser. No. 500,895
13 Claims. (Cl. 43—17)

This invention relates to fishing apparatus. More particularly it relates to an improved still-fishing device having means for signalling when a fish has taken the bait and means for indicating when line is being taken out by the fish. This invention further relates to improved fishing apparatus having a stationary line support spool with improved triggering of the signalling means for silent operation when the fish is taking the bait.

Ice-fishing is a favorite sport. Many devices have been constructed to assist the fisherman in determining when a fish has taken the bait. Such devices usually share a common characteristic in that a signalling device is activated when the fish takes the bait. One common signal is the raising of a colored flag in response to a fish activating a trigger mechanism by taking the bait. Commonly the release of the trigger releases the line to be fed from a submerged rotatable reel as the fish takes out line. The action of the reel often creates noise, presents a resistance to free flow of the line, and is subject to malfunction as a result of ice forming around the moving parts. Further, since these rotatable reels are commonly submerged, there is no surface indication as to whether or not the fish is still taking out line. It is desirable to know when the fish stops to determine when the hook should be set.

The subject invention avoids the foregoing problems, while providing visible indications that the fish has taken the bait, and whether or not the fish is continuing to take out line. To accomplish these results a staff is provided having a fixed spool mounted at one end for supporting the line. A trigger mechanism is also provided comprising a straight rod bent in the shape of an L, the major length extending longitudinally along the staff and the shorter length being a finger portion outwardly extending across the lower face of the spool and protruding past the lip of the spool. The upper end of the trigger extends above a portion of the staff for frictionally engaging a spring-loaded flag. The trigger mechanism is rotatably supported by the staff. The line wound on the spool extends over the protruding finger portion and through a line guide. The line guide maintains the line in contact with the finger portion. As the fish causes line to be taken out, the trigger mechanism is rotated, thereby releasing the spring-loaded flag and indicating a fish has taken the bait. As the fish takes out line, the finger portion is caused to describe a circle around the lower face of the spool. This motion is visible at the surface by viewing the rotation of the upper end of the trigger. The trigger mechanism is the only movable part and is water-sealed to prevent freeze-up. The conical shape of the spool in conjunction with the lip at the lower edge of the spool provides a silent free flow line as the fish takes out line.

The foregoing aspects of the invention are illustrated in detail in the drawings, in which: FIGURE 1 is a pictorial view of the fishing apparatus; FIGURE 2 is a bottom view of the spool and the trigger finger; FIGURE 3 is a back view of the device; FIGURE 4 is a schematic diagram of a signal light; FIGURE 5 is a pictorial view of the signal light attachment; FIGURE 6 is a bottom view of the light attachment; and FIGURE 7 is a pictorial view of the signal light assembly mounted on the fishing device.

FIGURE 1 illustrates pictorially the improved fishing device in a set condition. A staff 10 has a line supporting spool 12 mounted at its lower end. A cross-arm 14 is rotatably mounted at point 16. Point 16 is approximately at the mid-point of the length of staff 10 and approximately in the center of the back half of the staff. A screw and wing nut may be used to make this coupling. A cross-arm 18 is rotatably mounted at point 20 to cross-arm 14. Cross-arms 18 and 14 are of the same length, and are approximately the same length as staff 10. For this embodiment, these lengths are eighteen inches. Staff 10 is one and one-eighths inches on each cross-sectional edge. Point 20 can also be coupled by a screw and wing-nut and is not centered. Instead, it is about seven and one-half inches from one end of arms 14 and 18. Cross-arms 14 and 18 rest on the ice with the lower portion of staff 10 and spool 12 extending downwardly in the water. To fold up the device, cross-arm 18 is rotated in a horizontal plane as indicated by arrows 18a and 18b into alignment with cross-arm 14. Both cross-arms 14 and 18 are then moved in a verical plane as indicated by arrows 14a and 14b into alignment with staff 10. The spool 12 is fixedly mounted to the lower end of staff 10. This mounting can be by screws running through the spool 12 into staff 10, by glue-bonding the spool to the staff, or any other well-known method of mounting. Spool 12 has an upper surface 22 and a lower surface 24. A beveled neck 26 is foremd toward the upper end of spool 12. A conical surface 28 having a downwardly increasing cross-section is provided for supporting line 30. A rounded protruding lip 32 is formed at the lower edge of spool 12 for providing a raised smooth surface over which line 30 freely flows. The upper face 22 and the lower face 24 are approximately two and three-eighth inches in a diameter, and spool 12 is approximately one and three-fourths inches thick. The slope of conical surface 28 can vary, but a slope of approximately thirty degrees from vertical has been found to function as desired. A portion of the upper end of staff 10 is cut away leaving an opening of about four inches by five-eighth inch. The upper rearward edge 34 of staff 10 forms a bearing surface for spring member 36, which in turn supports flag 38. The upper end 40 of spring member 36 is at a rearwardly extending angle to the length of the spring member, as is the lower end 42 (see FIGURES 3 and 4). The trigger is a round metal rod extending along the central longitudinal axis of staff 10. The upper end 44 (see FIGURE 7) extends above surface 46 and has a frictional coating 48 thereon. This coating can be a rubber tubing slipped over the end of the trigger rod 44, or of other desired material. Material 48 operates to roll the spring member into a released position, and also operates to hold the trigger from sliding axially out of staff 10. End 40 of spring member 36 is brought into contact with frictional coating 48 on rod 44, and causes the device to be set. At the lower end of the trigger rod is a laterally-bent finger member 50 which extends beyond rounded lip 32 of spool 12 and engages line 30. Line guide 52 is formed of one-eighth inch square cross-sectional metal. The line guide has an outwardly extending portion 54 rotatably coupled to the back side of staff 10 immediately above upper surface 22 of spool 12. Portion 56 extends downwardly and bends inwardly along path 58. The line guide 52 is terminated at its lower end in loop 60. The center of loop 60 is on a center line with the longitudinal axis of staff 10. Loop 60 is arranged to receive line 30, and for maintaining line 30 in contact with finger 50 no matter which direction the line is taken out. Surfaces of loop 60 are smooth to provide minimal drag to taking out line. As line 30 is taken downwardly, pressure is exerted on finger 50 causing it to rotate in the direction of arrow 62. This direction will vary depending on how line 30 is wound on spool 12. This causes end 44 to rotate; and, as a result of frictional contact with surface 48, end 40 of spring member 36 is rolled past the holding surface edge and springs erect. This tripped position is shown in dashed lines with reference numerals having a added thereto. As line 30 continues to be taken out, end 44 continues to rotate, as indicated by circular arrow 64, thereby giving an indication above the surface that line is being taken out. A mark 66 (see FIGURE 7) is placed on surface 48 to assist in viewing this rotation.

FIGURE 2 is a bottom view and illustrates the axial alignment of spool 12, the trigger mechanism including finger 50, and loop 60 of line guide 52. A hole 61 is drilled diagonally toward the axial trigger hole in spool 12. A material such as pump grease mixed with wax is forced into hole 61, thereby sealing it, and thence around the trigger rod. This material provides lubrication for smooth rotation and prevents water from rising in staff 10 where it would freeze and cause malfunction.

FIGURE 3 is a rear view of the embodiment of the invention. All previously mentioned elements carry the same reference numerals. Spring member 36 is slidably attached to staff 10 by a pair of staples 68 and 70. End 42 prevents member 36 from becoming disengaged. Spring member 36 can be slid into dotted position 36b along staff 10 for storage. Mounting member 72 rotatably holds line guide 52 to staff 10. A pair of fingers retain the end of portion 54, and can be deflected by turning guide member 52 to permit the line guide to be swung into the position indicated by the dotted outline, and bearing reference numerals with a added.

For night or late evening fishing, flag 38 may be difficult to see. To inhance the signalling capability of the subject invention, a light mechanism is also provided. FIGURE 4 is an electrical schematic diagram of the light arrangement. A bulb 74 is provided with one lead 76 going to one terminal of battery 78. Battery 78 provides a potential V, which is 1.5 volts D.C. for this embodiment, for lighting bulb 74 when the circuit is completed. If two or more batteries are desired to provide increased power, they may be coupled in series as needed, or a larger voltage battery can be used. The other terminal of battery 78 is coupled via conductive path 80 to terminate 82. The other terminal of bulb 74 is coupled via conductive path 84 to terminal 86. Spring member 36 is of electrical conductive material and when set has end 42 in contact with terminal 82, but out of contact with terminal 86. No complete circuit is made so bulb 74 is not lighted. When a fish activates the trigger mechanism and spring member 36 is released to position 36a, it makes contact with terminal 86 and the circuit thus completed causes bulb 74 to light. If it is desired to operate the fishing apparatus with the light attachment in place, but not to operate the light, spring member 36 can be slid farther up staff 10 so that end 42 no longer contacts terminal 82. When the device is activated, a circuit will not be completed.

FIGURE 5 is a pictorial view of the detachable light assembly and FIGURE 6 is a bottom view of this assembly. The light assembly includes housing 88 for supporting bulb 74 and for enclosing battery 78. A pair of brackets 90 and 92 are coupled to housing 88, and are of a shape to slide over the upper end of staff 10 and hold the assembly in a position where the circuit can be completed by spring member 36 (see FIGURE 7). Screw 86 forms terminal 86 of the electrical circuit and conductive strip 82 forms contact 82. Strip 82 is L shaped and has a conductive path 80 passing under the underside of housing 88 to make contact with battery 78 and to retain it in housing 88. Screw 94 (see FIGURE 6) holds conductive path 80 against battery 78. Spring member 36 contacts strip 82 and screw 86 to complete the electrical circuit to cause light bulb 74 to light. FIGURE 7 illustrates the light assembly in position on the upper end of staff 10. If two or more batteries are desired for providing more power, housing 88 can be made larger.

It is understood that various modifications can be made in the structure illustrated without departing from the spirit of the invention. What is to be protected by Letters Patent is defined in the appended claims.

What is claimed is:
1. Fishing apparatus comprising: a staff member having first and second ends; line supporting means fixedly coupled to one of said ends of said staff member; line guide means coupled to said staff member for guiding line as it is fed from said line supporting means; a spring member having first and second ends and slidably coupled to said staff member; a rotatable trigger mounted on said staff member, said trigger having a spring-member-engaging portion, and a finger portion for engaging line wound on said line supporting means, said rotatable trigger being activated by line pressure on said finger portion; and support means coupled to said staff member intermediate said first and second ends for holding said staff member in an upright position.

2. Apparatus as in claim 1 wherein said line supporting means comprises a round spool having first and second opposite surfaces, said first surface adapted to be coupled to said one end of said staff member, a neck portion intermediate said surfaces and parallel thereto, a conical surface downwardly extending from said neck portion, said conical surface describing an increasing cross-sectional area of said spool, and a circumferential lip portion intermediate said conical surface and said second surface.

3. Apparatus as in claim 1 wherein said line guide member comprises a metallic member having an outwardly extending portion having opposing ends with a first of said ends adapted to be rotatably coupled to said staff member, a downwardly extending portion coupled to the other of said opposite ends and terminated in a line receiving loop.

4. Apparatus is in claim 3 and further including line guide mounting means comprising a metallic body portion adapted to be fixedly mounted to said staff member, and having a pair of resilient finger members for restraining said first end of said outwardly extending portion of said line guide member between said finger members and the surface of said staff member.

5. Apparatus is in claim 1 wherein said spring member comprises an elongated strip of spring metal having a longitudinal axis and having a width dimension greater than its thickness dimension, said first and second ends including portions extending at a predetermined angle to said longitudinal axis, said spring member further including a signal flag mounted thereon.

6. Apparatus as in claim 5 wherein said spring member is comprised of electrically conductive material.

7. Apparatus is in claim 6 and further including signal light apparatus having a housing for receiving a battery, said battery having first and second terminals, first and second electrical contacts, a bulb having first and second connection points and mounted on said housing, first conductive means for coupling said first battery terminal to said first bulb connection point when a battery is in said housing, second conductive means for coupling said second battery terminal to said first electrical contact when a battery is in said housing, third conductive means for coupling said second bulb connection point to said second electrical contact, mounting means coupled to said housing for slidably coupling said housing to said staff member in a position where said first end portion of said spring member is in contact with one of said electrical contacts and out of contact with the other of said electrical contacts when said spring member is engaged by said spring-member-engaging portion, said spring member arranged to make electrical contact with the other of said contacts when said spring member is released by activation of said trigger for completing the electrical circuit and causing said bulb to light.

8. Apparatus as in claim 2 wherein said staff member and said spool are comprised of wood and have a hole running longitudinally through at least a portion of said staff member and through the center of said spool for receiving said trigger, and including water sealing material surrounding said trigger at least in the spool portion of said hold for preventing freezing of said trigger and for lubricating said rotatable trigger.

9. Apparatus as in claim 1 wherein said support means comprises a first rod member rotatably coupled to said staff member and a second rod member rotatably coupled to said first rod member, said first and second rod members being adapted to rest on ice for supporting said staff member in a substantially upright position with said line supporting means submerged in water.

10. Apparatus as in claim 1 wherein said spring-member-engaging portion includes a frictional coating placed over said portion for frictionally engaging one of said ends of said spring member, and including marking means on at least a portion of said coating for indicating line is being taken out when the line causes said finger portion to rotate, said marking means being visible without moving said staff member, and said coating operative to at least assist in restraining said trigger in said staff member.

11. A stationary line supply device for use with a fishing apparatus having a pair of supporting arms coupled to a staff for holding the staff in an upright position and a spring member carrying a flag coupled to the staff, the staff having a rotatable trigger rod running through at least a portion of its length with a spring-member engaging portion extended at one end and a trigger finger extended at the other end, said line supply device comprising; a spool positioned between said other end of the staff and the trigger finger and having one surface coupled to the said other end of the staff, said spool having a tapered line holding portion with a raised rounded lip at one extremity and a second surface, a line guide member extending from the staff downwardly around the spool and having a line receiving loop separated from said second surface and arranged for holding line wound on said spool in contact with the trigger finger at said rounded lip for causing line to be fed from said spool by slipping off said tapered surface, the line movement causing the trigger finger to move parallel to said second surface.

12. For use with fishing apparatus having means for supporting a staff, with a flag supporting spring member coupled to the staff at one end, and a trigger mechanism for holding the spring member in a set position until activated by a fishing line causing movement of the trigger thereby causing the spring member to be released to an indicating position, a signal light apparatus comprising: a housing for receiving a battery, said battery having first and second connection points, first and second electrical contacts, a bulb having first and second terminals and mounted on said housing, first conductive means for coupling said first battery connection point to said first bulb terminal when a battery is in said housing, second conductive means for coupling said second battery connection point to said first electrical contact when a battery is in said housing, third conductive means for coupling said second bulb terminal to said second electrical contact, mounting means coupled to said housing for slidably coupling said housing to the staff in a position where the one end of the spring member is in contact with one of said electrical contacts and out of contact with the other of the electrical contacts when the spring member is in the set position, the spring member being arranged to make electrical contact with the other of the contacts when the spring member is released to the indicating position thereby completing the electrical circuit and causing said bulb to light.

13. Fishing apparatus comprising: a staff member having first and second ends; support means coupled to said staff member intermediate said first and second ends; line supporting means fixedly coupled to one of said ends, said supporting means including a round spool having first and second opposite surfaces, said first surface adapted to be coupled to said one end of said staff member, a neck portion intermediate said surfaces and parallel thereto, a conical surface downwardly extending from said neck portion, said conical surface describing an increasing cross-sectional area of said spool, and a circumferential lip portion intermediate said conical surface and said second surface; line guide means coupled to said staff member for guiding line as it is fed from said line supporting means, said line guide means including a metallic member having an outwardly extending portion having opposite ends with a first of said ends adapted to be rotatably coupled to said staff member, a downwardly extending portion coupled to the other of said opposite ends and terminated in a line receiving loop; line guide mounting means having a body portion mounted to said staff member, and having a pair of resilient finger members for restraining said first end of said outwardly extending portion of said line guide member between said finger members and the surface of said staff member; an elongated spring member having first and second ends and slidably coupled to said staff member; a rotatable trigger mounted on said staff member, said trigger having a spring-member-engaging portion for holding said spring member in the set position, said spring-member-engaging portion including a frictional coating thereon, and a finger portion for engaging line wound on said line supporting means, said rotatable trigger being activated by line pressure on said finger portion for releasing said spring member into an indicating position.

References Cited

UNITED STATES PATENTS

| | | | |
|---|---|---|---|
| 2,565,379 | 8/1951 | Laurila | 43—17 |
| 2,720,719 | 10/1955 | Stancheck et al. | 43—17 |
| 2,741,054 | 4/1956 | Brundage | 43—17 |
| 2,785,493 | 3/1957 | Thiel | 43—17 |
| 2,834,140 | 5/1958 | Knier | 43—17 |

SAMUEL KOREN, *Primary Examiner.*

D. J. LEACH, *Assistant Examiner.*